United States Patent [19]
Blahak et al.

[11] 3,719,717
[45] March 6, 1973

[54] PROCESS FOR THE PRODUCTION OF AROMATIC DINITROHALOGEN COMPOUNDS

[75] Inventors: Johannes Blahak, Cologne, Germany; Walter Meckel, Martinsville, United States Of America

[73] Assignee: Farbenfabriken Bayer Aktiengesellschaft, Leverkusen, Germany

[22] Filed: Jan. 5, 1971

[21] Appl. No.: 104,144

[30] Foreign Application Priority Data

Jan. 15, 1970 Germany...................P 20 01 570.7

[52] U.S. Cl............260/646, 260/456 P, 260/476 R, 260/592, 260/607 A
[51] Int. Cl.......................C07c 79/12, C07c 139/00
[58] Field of Search.......260/646, 456 P, 476 R, 592, 260/607 A

[56] References Cited

UNITED STATES PATENTS 3,221,065  11/1965  Vance..................................260/646

Primary Examiner—Leland A. Sebastian
Attorney—Burgess, Dinklage & Sprung

[57] ABSTRACT

Aromatic dinitrohalogen compounds are prepared by reacting aromatic dinitrohydroxy compounds with an acid halide such as phosgene in the presence of an acylated secondary amine as a catalyst at a temperature of from about 50° to 200°C.

12 Claims, No Drawings

PROCESS FOR THE PRODUCTION OF AROMATIC DINITROHALOGEN COMPOUNDS

BACKGROUND

This invention relates to a particularly advanced process for the production of aromatic dinitrohalogen compounds by reacting corresponding hydroxy compounds with acid halides in the presence of catalytic quantities of an acylated secondary amine.

It is known that aromatic polynitrohalogen compounds can be obtained from corresponding polynitrohydroxy compounds by replacing with halogen the hydroxy groups which are activated by nitro groups. Preferred exchange reagents are acid chlorides in the presence of equimolar quantities of a tertiary amine. One preferred process uses p-toluene sulphochloride in the presence of a molar amount of diethyl aniline. The yields obtained are from about 60 to 80 percent of the theoretical (see Houben-Weyl, Methoden der organischen Chemie, 1962, Vol. V/3, page 896).

SUMMARY

A process has now been found for the production of aromatic dinitrohalogen compounds by reacting corresponding dinitrohydroxy compounds with acid halides in the presence of catalysts wherein an aromatic hydroxy compound having up to 14 ring carbon atoms in the aromatic portion and containing up to two hydroxy groups at least one which is activated by at least two nitro groups in the ortho-positions to the —OH group or in the ortho- and para-positions to the —OH group, while up to three of the remaining hydrogen atoms of the aromatic hydroxy compound can also be substituted by similar or different radicals, such as halogen, alkyl, COO-alkyl, CO-alkyl, $SO_3$-alkyl, $CF_3$ or $SO_2$ -alkyl radicals, is reacted with at least the stoichiometrically necessary quantity of an acid halide in the presence of a catalytic quantity of an acylated secondary amine, at a temperature in the range from about 50° to about 200°C..

DESCRIPTION

Alkyl substituents on the aromatic hydroxy compound have one to 10 carbon atoms, preferably one to four, and most preferably one or two, carbon atoms.

Catalysts preferably used for the process according to the invention include lower carboxylic acid amides of the general formula

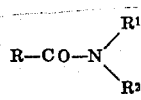

in which R represents hydrogen, alkyl with one to six carbon atoms, or a group of the formula

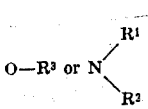

and the radicals $R^1$, $R^2$ and $R^3$, which can be the same or different, each represents an alkyl radical with one to four carbon atoms or the radicals $R^1$ and $R^2$, together with the nitrogen atom to which they are attached, or the radicals $R^1$ and R, together with the group

can form a 5- to 7-membered ring, optionally containing a further hetero atom or atoms.

Hetero atoms include oxygen, sulphur and a nitrogen atom substituted by a lower alkyl radical (up to four carbon atoms). Dimethyl formamide is a particularly preferred carboxylic acid amide for carrying out the process according to the invention.

The catalyst is added in a concentration of from 0.1 to 50 percent by weight, and preferably in a concentration of from 1 to 10 percent by weight, based on the starting aromatic hydroxy compound.

Acid halides include thionyl chloride and thionyl bromide, although in principle it is also possible to use other acid halides, for example acetyl chloride, acetyl bromide, oxalyl chloride, oxalyl bromide or p-toluene sulphochloride; preferably phosgen is used.

The process can be carried out either in solution or, in some instances, even in the melt, at temperatures in the range of from 50° to 200°C.. The hydroxy compound used is preferably dissolved in an inert organic solvent, for example benzene, toluene, xylene, chlorobenzene or o-dichlorobenzene, and then reacted with the acid halide, following the addition of e. g. approximately 5 percent by weight of the catalyst. The reaction is preferably carried out temperatures of from 75° to 150°C. To carry out the process, the acid halide is generally used in at least the stoichiometrically necessary quantity per OH-group to be exchanged, but preferably in an excess of up to about 20 percent by weight. Instead of working in an inert solvent, it is, of course, also possible in some instances, to work in an excess of acid halide, providing it boils at temperatures above 50°C.. In a preferred embodiment the reaction is carried out at the boiling point of the reaction mixture.

The process according to the invention can be carried out with aromatic compounds based on benzene, naphthalene or a fused three ring compound such as anthraca. Preferred are benzene compounds. Each has at least one —OH group and, in addition to the activating nitro groups, one or two, preferably one, other ring substituent identified above.

The starting compounds used in the process according to the invention can be represented by the general formulas I and II, the 2,6-dinitrophenols (II) being preferred:

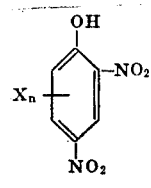 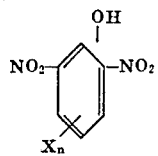

(I)          (II)

In these formulas,

X (in addition to hydrogen) represents halogen (preferably fluorine, chlorine or bromine), alkyl, COO-alkyl, CO-alkyl, $SO_3$-alkyl, $CF_3$ or $SO_2$-alkyl, the alkyl radicals having 1 to 10, preferably 1 to 6, and most preferably one or two carbon atoms, and $n$ represents 1, 2 or 3.

The following are but a few examples of starting compounds that may preferably be used for the process according to the invention:

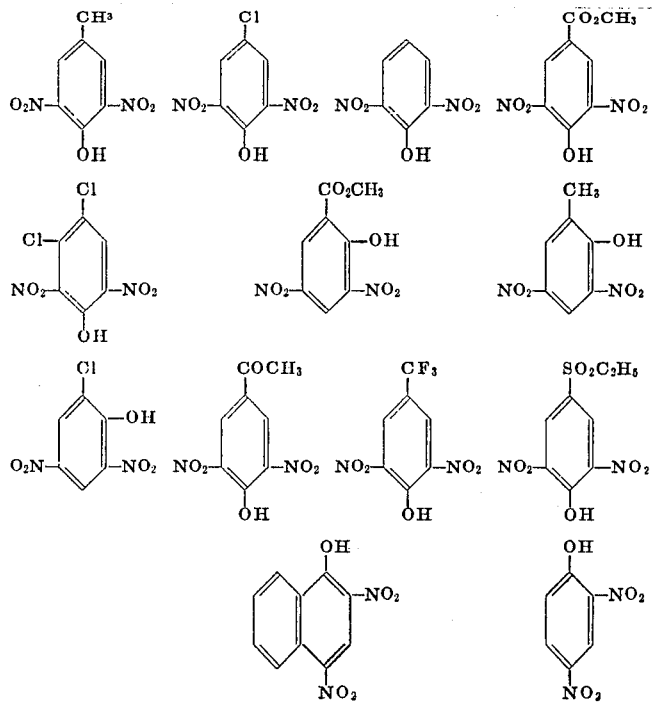

The process is illustrated by the following equation:

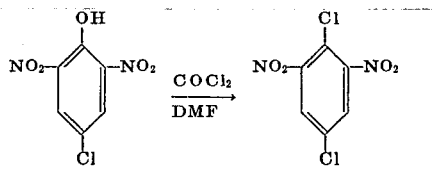

The following are examples of the compounds which can be obtained by the process according to the invention:

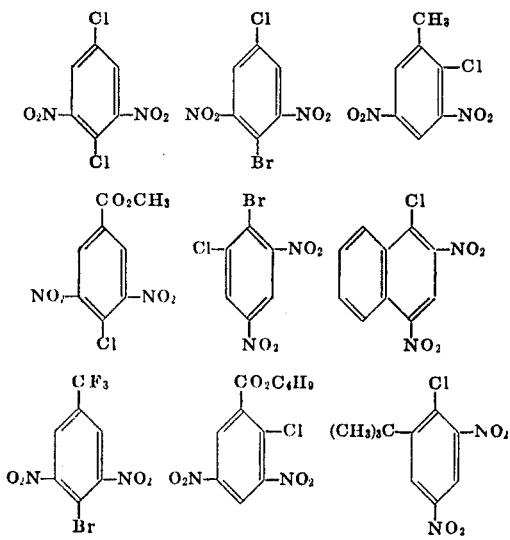

The yields amount to from 90 to 100 percent. The advantage of the process according to the invention over reactions known from the literature lies in greater control over the reaction which gives, in an almost quantitative yield, pure products which are extremely difficult to obtain by other methods.

The fact that the process according to the invention can be carried out so smoothly must be regarded as extremely surprising, because it had been assumed from the prior art that carbonates and carbonic acid ester chlorides would be formed. See J. American Chem. Soc. 56, 1586 (1934).

The dinitrocompounds obtainable by the process according to the invention can be converted by the usual methods into the corresponding amines, which can be used for the production of dyes (D.R.P. 177 623), plant-protection (U.S. Pat. No. 3,257,190) agents etc.

In the following examples, temperature are expressed in degrees Centigrade.

Example 1 (method A)

20 g. of thionyl chloride and 20 g. of 4-chloro-2,6-dinitrophenol are dissolved in 200 ml. of benzene. Following the addition of 1.5 g. of dimethyl formamide, the mixture is brought to the boil. A vigorous evolution of hydrogen chloride and sulphur dioxide begins at 70°C.. After 1 hour, the excess thionly chloride is distilled off. The crystalline residue is taken up in benzene and washed three times with 100 ml. of water. The solvent is distilled off. The required compound, 1,4-dichloro-2,6-dinitrobenzene, is obtained in a yield of 21 g. (100 percent), m.p. 101°–103°C.. After recrystallization from ethanol, it melts at 104°–105°C. (lit. m.p. 104°–105°C.).

Example 2 (method B)

20 g. of 4-chloro-2,6-dinitrophenol are heated under reflux in 200 ml. of xylene to which 2 g. of dimethyl formamide have added, accompanied by the introduction of phosgene.. The reaction, which actually begins below 100°C., is over after 30 minutes at 140°C.. Excess phosgene is removed by a vigorous stream of nitrogen. The product 1,4-dichloro-2,6-dinitrobenzene is left in an almost quantitative yield of 21 g. (97 percent of the theoretical), m.p. 105°–107°C. from ethanol.

The following compounds are similarly obtained:

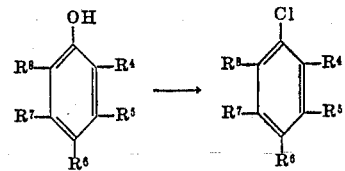

| Example | Method | $R^4$ | $R^5$ | $R^6$ | $R^7$ | $R^8$ | %yield | m.p. (°C.) |
|---|---|---|---|---|---|---|---|---|
| 3 | A | $NO_2$ | H |  | $CH_3$ | H | $NO_2$ | 95 | 114 |
| 4 | A | $NO_2$ | H | $CO_2CH_3$ | H | $NO_2$ | 94 | 103 |
| 5 | A | $NO_2$ | H | $NO_2$ | H | Cl | 95 | 55 |
| 6 | A | $NO_2$ | H | $NO_2$ | H | $CO_2CH_3$ | 98 | 87 |
| 7 | A | $NO_2$ | H | $NO_2$ | H | $NO_2$ | 97 | 82 |
| 8 | B | $NO_2$ | H | $CH_3$ | H | $NO_2$ | 96 | 115 |
| 9 | B | $NO_2$ | H | $NO_2$ | H | $CO_2CH_3$ | 95 | 86 |

Example 10

20 g. of 4-hydroxy-3,5-dinitrotoluene are dissolved in 200 ml. of xylene. Following the addition of 1.5 g. of tetramethyl urea, phosgene is introduced at 100° to 140°C.. After 2 hours, the reaction is complete.

By working up the reaction as described in Example 1, 4-chloro-3,5-dinitrotoluene is obtained in a yield of 90 percent (m.p. 112°–114°C.).

Example 11

2 g. of dimethyl formamide and 20 g. of 2-hydroxy-3,5-dinitrotoluene are dissolved in 200 ml. of o-dichlorobenzene. Following the addition of 1.5 g. of dimethyl formamide, phosgene is introduced at 160°C.. The reaction is quantitative after 3 hours.

By working up the reaction mixture as described in Example 1, 2-chloro-3,5-dinitrotoluene is obtained in a yield of 74 percent (m.p. 63°C.).

Example 12

The procedure is as in Example 2, except that the reaction is carried out with 25 g. of 4-chloro-2,6-dinitrotoluene in 250 ml. of xylene, using 2 g. of tetramethyl urea as catalyst. The reaction is complete after heating for 1 hour at 140°C.,. The yield of 1,4-dichloro-3,5-dinitrobenzene is 27 g. (approximately 100% of the theoretical), m.p. 103°–105°C..

What we claim is:

1. A process for the production of aromatic dinitrohalogen compounds which comprises reacting an aromatic dinitrohydroxy compound containing up to 14 ring carbon atoms in the aromatic portion and having one or two hydroxy at least one of which is activated by at least two nitro groups ortho- or ortho- and para- to the —OH group with at least the stoichiometrically necessary quantity of phosgene in the presence of an acylated secondary amine as catalyst at a temperature in the range from about 50° to about 200°C..

2. A process as claimed in claim 1, wherein the catalyst comprises from 0.1 to 50 percent by weight, based on the dinitrohydroxy compound, of a carboxylic acid amide of the general formula

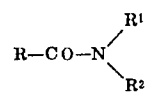

in which R represents hydrogen, alkyl with one to six carbon atoms, or a group of the formula

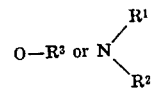

and the radicals $R^1$, $R^2$ and $R^3$, which can be the same or different, each represents an alkyl radical with one to four carbon atoms, or the radicals $R^1$ and $R^2$, together with the nitrogen atom to which they are attached, or the radicals $R^1$ and R, together with the grouping

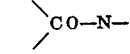

form a 5- to 7-membered ring.

3. A process as claimed in claim 1 wherein said 5- to 7-membered ring contains at least one hetero atom.

4. A process as claimed in claim 1 wherein the catalyst is dimethyl formamide.

5. A process as claimed in claim 1 wherein the catalyst is used in an amount of from 1 to 10 percent by weight, based on the dinitrohydroxy compound.

6. A process as claimed in claim 1 wherein the temperature is from about 75° to about 150°C..

7. A process as claimed in claim 1 wherein the catalyst is tetramethyl urea.

8. A process as claimed in claim 1 wherein the dinitrohydroxy compounds has the general formula

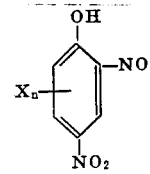

in which each symbol X, which may be the same or different, represents halogen, alkyl, COO-alkyl, CO-alkyl, $SO_3$-alkyl, $CF_3$ or $SO_2$-alkyl, the alkyl radicals having 1 to 10 carbon atoms, and n represents 1, 2 or 3.

9. A process as claimed in claim 1 wherein the dinitrohydroxy compound has the general formula

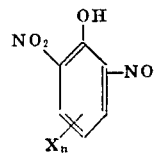

in which each symbol X, which may be the same or different, represents halogen, alkyl, COO-alkyl, CO-alkyl, $SO_3$-alkyl, $CF_3$ or $SO_2$-alkyl, the alkyl radicals having 1 to 10 carbon atoms, and $n$ represents 1, 2 or 3.

10. A process as claimed in claim 1 wherein the reaction is carried out in solution in an inert organic solvent.

11. A process as claimed in claim 10 wherein the solvent is selected from the group of benzene, toluene, xylene, chlorobenzene and o-dichlorobenzene.

12. A process as claimed in claim 1 wherein phosgene is used in an excess of up to 20 percent by weight.

* * * * *